United States Patent
Sakai et al.

(10) Patent No.: US 7,806,327 B2
(45) Date of Patent: Oct. 5, 2010

(54) SYSTEM AND METHOD FOR ACCESSING INFORMATION WHILE MONITORING A FREQUENCY OF ACCESS

(75) Inventors: Kenichiro Sakai, Kawasaki (JP); Hirotaka Chiba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 37 days.

(21) Appl. No.: 12/071,801

(22) Filed: Feb. 26, 2008

(65) Prior Publication Data

US 2008/0203149 A1 Aug. 28, 2008

(30) Foreign Application Priority Data

Feb. 28, 2007 (JP) .............. 2007-050801

(51) Int. Cl.
*G06F 19/00* (2006.01)
*G06Q 30/00* (2006.01)
*G06Q 90/00* (2006.01)
*G06K 5/00* (2006.01)

(52) U.S. Cl. .................. 235/382; 235/375; 726/26; 726/27

(58) Field of Classification Search .............. None
See application file for complete search history.

(56) References Cited

U.S. PATENT DOCUMENTS

| 5,841,978 | A | | 11/1998 | Rhoads | |
| 5,992,752 | A | * | 11/1999 | Wilz et al. | 235/472.01 |
| 2002/0059436 | A1 | * | 5/2002 | Kubo | 709/229 |
| 2002/0120503 | A1 | * | 8/2002 | Iwayama et al. | 705/14 |
| 2002/0169963 | A1 | * | 11/2002 | Seder et al. | 713/176 |
| 2003/0009673 | A1 | | 1/2003 | Hayashi et al. | |
| 2004/0205226 | A1 | * | 10/2004 | Aoki et al. | 709/232 |
| 2005/0171846 | A1 | * | 8/2005 | Moroo | 705/14 |
| 2005/0278230 | A1 | * | 12/2005 | Shirasaka et al. | 705/26 |
| 2007/0023524 | A1 | * | 2/2007 | Sakai et al. | 235/454 |
| 2007/0067420 | A1 | * | 3/2007 | Yamaguchi | 709/219 |
| 2007/0097445 | A1 | * | 5/2007 | Tachi et al. | 358/3.28 |
| 2007/0146797 | A1 | * | 6/2007 | Sakai et al. | 358/3.28 |
| 2007/0215685 | A1 | * | 9/2007 | Self et al. | 235/375 |

FOREIGN PATENT DOCUMENTS

EP 1 308 821 5/2003
WO WO 2006030521 A1 * 3/2006

OTHER PUBLICATIONS

Extended European Search Report, mailed Jun. 11, 2008 and issued in corresponding European Patent Application No. 08152044.7-1527.

* cited by examiner

*Primary Examiner*—Michael G Lee
*Assistant Examiner*—Suezu Ellis
(74) *Attorney, Agent, or Firm*—Staas & Halsey LLP

(57) ABSTRACT

A system includes a client that obtains a code included in an image, and sends out the code and identification information of the client, and a server that obtains content address information based on a frequency of access, the code and the identification information received from the client, from a table stored in the server provides the content address information to the client whereby the client is enabled to obtain content information by using the content address information.

7 Claims, 13 Drawing Sheets

| Code | Conversion –server URL storage unit |
|---|---|
| 0000000000~0999999999 | www.server0.co.jp |
| 1000000000~1999999999 | www.server1.co.jp |
| ... | ... |
| 9000000000~9999999999 | www.server9.co.jp |

Fig. 7

| Cumulative number of accesses | Conversion–server URL storage unit |
|---|---|
| N1 | www.contents-court-N1.co.jp |
| N2 | www.contents-court-N2.co.jp |
| ... | ... |
| Nk | www.contents-court-Nk.co.jp |

Fig. 6

| Code (10-digit decimal) | Serial number | | | |
|---|---|---|---|---|
| | S1 | S2 | ... | Sn |
| C1 | P11 | P12 | ... | P1n |
| C2 | P21 | P22 | ... | P2n |
| ... | ... | ... | ... | ... |
| Cm | Pm1 | Pm2 | ... | Pmn |

Fig. 12

| Code (10-digit decimal) | Serial number | | | |
|---|---|---|---|---|
| | S1 | S2 | ... | Sn |
| C1 | E11 | E12 | ... | E1n |
| C2 | E21 | E22 | ... | E2n |
| ... | ... | ... | ... | ... |
| Cm | Em1 | Em2 | ... | Emn |

Fig. 11

| Code (10-digit decimal) | Serial number | | | |
|---|---|---|---|---|
| | S1 | S2 | ... | Sn |
| C1 | U11 | U12 | ... | U1n |
| C2 | U21 | U22 | ... | U2n |
| ... | ... | ... | ... | ... |
| Cm | Um1 | Um2 | ... | Umn |

Fig. 13

| Code (10-digit decimal) | Serial number | | | |
|---|---|---|---|---|
| | S1 | S2 | ... | Sn |
| C1 | I11 | I12 | ... | I1n |
| C2 | I21 | I22 | ... | I2n |
| ... | ... | ... | ... | ... |
| Cm | Im1 | Im2 | ... | Imn |

SYSTEM AND METHOD FOR ACCESSING INFORMATION WHILE MONITORING A FREQUENCY OF ACCESS

BACKGROUND OF THE INVENTION

1. Field of the Invention

The present invention relates to an information providing system and a conversion server used in the system.

2. Description of the Related Art

Examples of the related art include an information providing system disclosed in PCT Publication No. WO 2006-030521.

SUMMARY

According to an aspect of an embodiment, a system comprises a client for obtaining a code included in an image, and sending out the code obtained by the client and identification information of the client and a server for obtaining address information on the basis of the code received from the client in association with the address information, identifying a table containing content address information, obtaining content address information on the basis of the code and the identification information in reference to the table, and providing the content address information to the client whereby the client is enable to obtain content information by using the content address information.

BRIEF DESCRIPTION OF THE DRAWINGS

FIG. 6 illustrates a pointer storage unit;

FIG. 7 illustrates a content URL storage unit;

FIG. 11 illustrates a content URL storage unit;

FIG. 12 illustrates an expiration data storage unit;

FIG. 13 illustrates an access interval storage unit;

DESCRIPTION OF THE PREFERRED EMBODIMENTS

Techniques for acquiring a piece of content (hereinafter, referred to as "content object") include an approach using a code having lower redundancy than the uniform resource locator (URL) of the content object. The code is embedded in an image printed on a medium. The image is read and the code is extracted from the read image. The content URL corresponding to the code is acquired using the code.

For products, such as cards, on each of which an image having a code embedded therein is printed, there are some products to each of which a value is added after the product is used a predetermined number of times or for a predetermined period of time. Unfortunately, a method of appropriately assigning a content object to such a product has not yet been developed.

Figure 1:
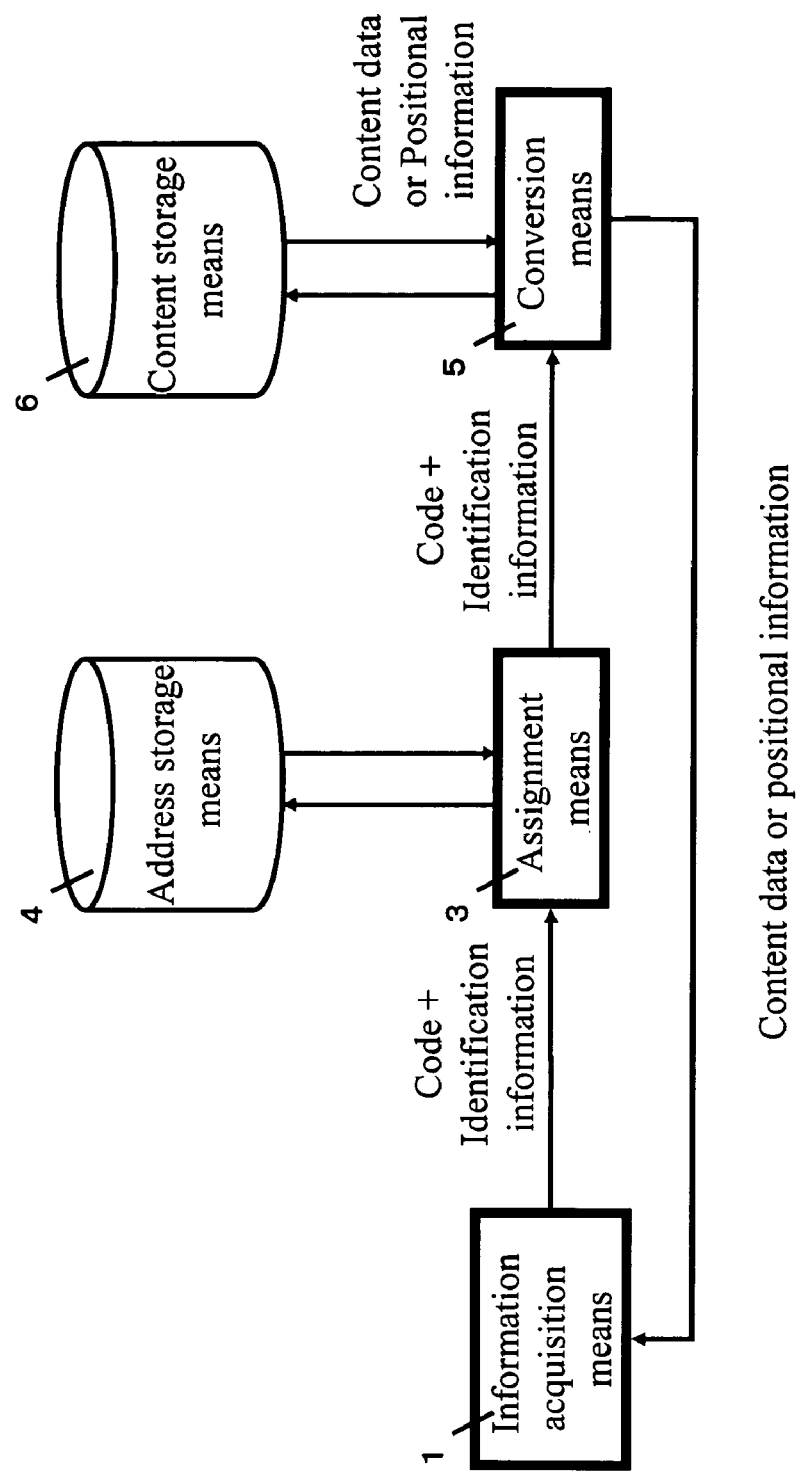
FIG. 1 is a diagram illustrating the structure of an information providing system according to an implementation consistent with the principles.

Embodiments will be described below in detail with reference to the drawings. The embodiments contain subject matter related to Japanese Unexamined Patent Application Publication No. 2007-41632, the entire contents of which are hereby incorporated herein by reference. FIG. 1 illustrates the structure of an information providing system according to an implementation consistent with the principles.

Referring to FIG. 1, a user operates information acquisition means (user terminal) 1 to extract a code from an image and transmits the extracted code and terminal identification information related to the information acquisition means 1 to assignment means 3. The assignment means 3 specifies conversion means, which can acquire either content data corresponding to the received code or positional information related to the content data, using address storage means 4 in which codes are associated with the addresses of a plurality of conversion means. The assignment means 3 transmits the received code and the received terminal identification information to the specified conversion means. Typically, there are a plurality of conversion means 5, though all of the conversion means 5 are not shown in FIG. 1.

When receiving the code and the terminal identification information, the conversion means 5 transmits either content data corresponding to the received code and terminal identification information or positional information related to the content data using content storage means 6, in which content data or positional information related to the content data is associated with each combination of a code and terminal identification information.

Figure 2:
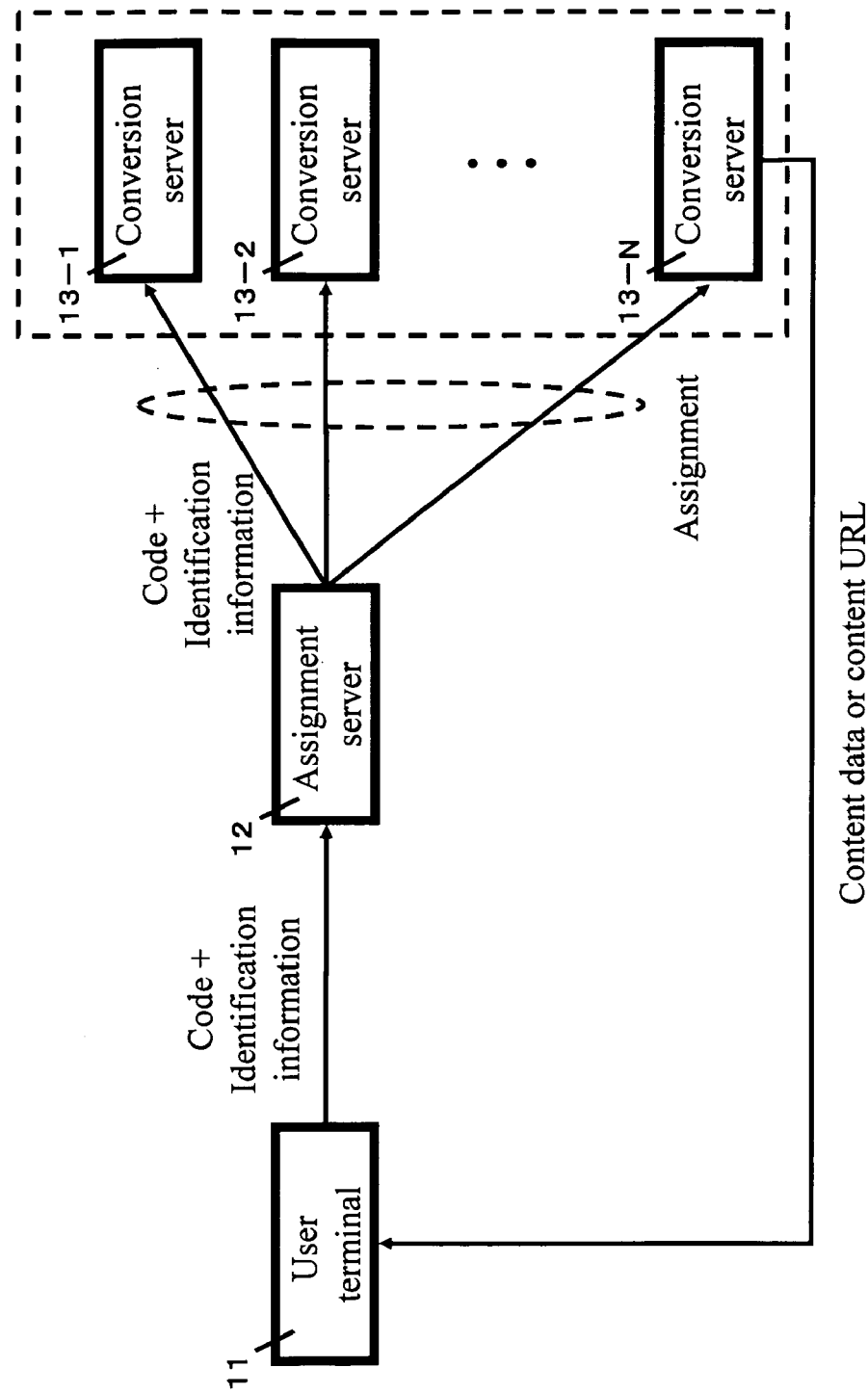
FIG. 2 is a diagram illustrating the conceptual structure of an information providing system common to embodiments.

FIG. 2 illustrates the conceptual structure of an information providing system common to the embodiments. Referring to FIG. 2, a client 11 reads an image having a code embedded therein from a printed medium, on which the image is printed, and extracts the code from the read image. The user terminal 11 transmits the extracted code and identification information, such as identification information used to identify the user terminal 11 in a hardware manner or identification information assigned to software for extracting the ID of a content object installed in the user terminal 11, to an assignment server 12.

The assignment server 12 specifies a conversion server, which can acquire either a content object corresponding to the code or positional information related to the content object, using the received code. In the following description, the positional information related to the content object will also be called "content URL". The assignment server 12 transfers a combination of the received code and identification information to the specified conversion server.

In FIG. 2, there are N conversion servers 13-1 to 13-N, serving as assignment destinations of the assignment server 12. Typically, a conversion server is arranged for each provider, serving as a content provider. For the sake of simplicity, a single conversion server is shown in diagrams subsequent to FIG. 2.

Referring to FIG. 2, any of the N conversion servers 13-1 to 13-N receives the combination of the code and the identification information. The relevant conversion server transmits either a content object corresponding to the combination of the received code and identification information or the content URL to the user terminal 11.

The code embedded in the image is data used to specify the corresponding content object. The redundancy of the code is lower than the content URL. In this case, each code is a 10-digit decimal number.

Figure 3:
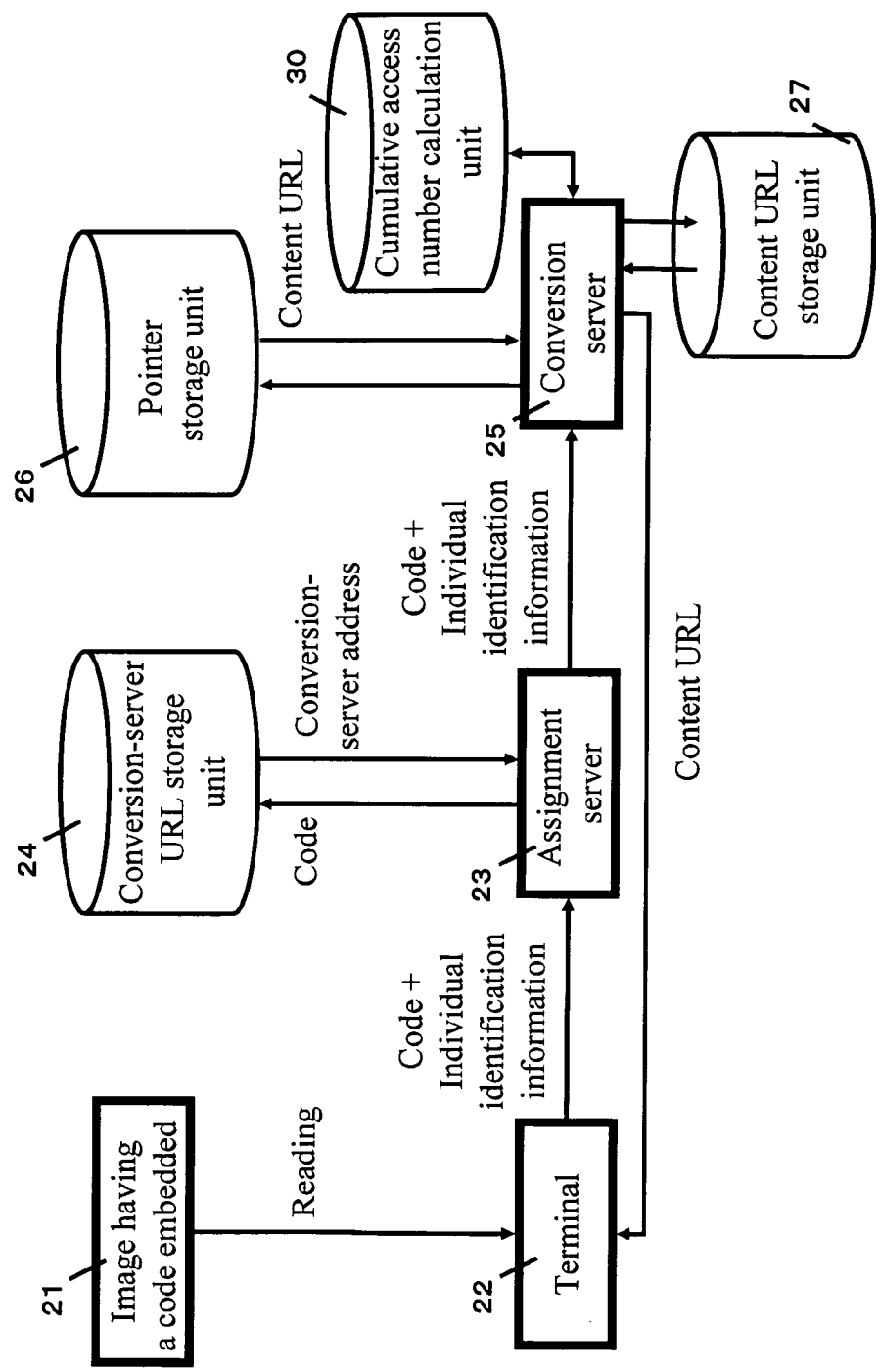
FIG. 3 is a block diagram showing the structure of an information providing system according to a first embodiment.

In the following embodiments, which will be described below, each conversion server holds only data containing content URLs corresponding to respective codes. FIG. 3 is a block diagram illustrating the structure of an information providing system according to a first embodiment.

Referring to FIG. 3, a terminal (camera-equipped mobile phone) 22 is operated by a user. The user operates the camera-equipped mobile phone 22 to read an image 21 having a code embedded therein from a printed medium and extract the code from the read image. The user operates the camera-equipped mobile phone 22 to transmit the extracted code and individual identification information, which is used to identify the terminal 22 in a hardware manner, to an assignment server 23. The assignment server 23 has a processor.

In the present embodiment, for the sake of simplicity, the individual identification information is sent. Actually, either the individual identification information or identification information assigned to a program downloaded to the terminal is used as identification information of the terminal.

Figures 4, 5:
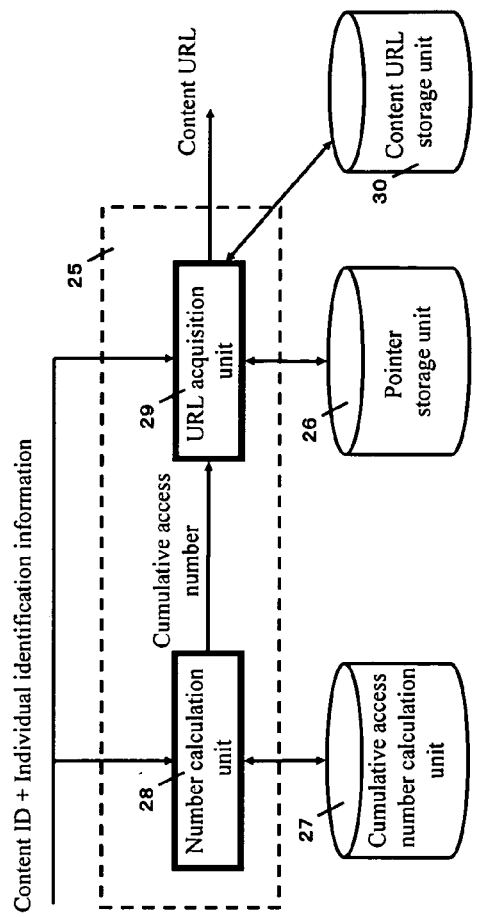
FIG. 4 illustrates a conversion-server URL storage unit.
FIG. 5 is a block diagram illustrating the detailed structure of a conversion server in FIG. 3.

The assignment server 23 specifies a conversion server, which can acquire either a content object corresponding to the received code or the content URL of the content object, using a conversion-server URL storage unit 24 in which codes are associated with the addresses of conversion servers (hereinafter, conversion server URLs), respectively. The assignment server 23 transfers a combination of the received code and individual identification information to the specified conversion server. In the present embodiment, it is assumed that each code is a 10-digit decimal number and the most significant digit of the code is used to specify a conversion server. Referring to FIG. 4, the conversion-server URL storage unit 24 stores the ranges of codes and conversion server URLs such that each range is associated with the corresponding conversion server URL. The first two or more digits of each code may be used to specify a conversion server as necessary.

A conversion server 25 receives the combination of the code and the individual identification information from the assignment server 23. The conversion server has a processor. The conversion server 25 transmits data indicating a content URL, which corresponds to the received code and individual identification information and the cumulative number of accesses calculated, using a content URL storage unit 30 and a pointer storage unit 26. In the content URL storage unit 30, the cumulative numbers of accesses are associated with respective content URLs. In the pointer storage unit 26, pointers in the content URL storage unit 30 are associated with respective combinations of codes and individual identification information blocks.

FIG. 5 is a block diagram illustrating the detailed structure of the conversion server 25 in FIG. 3. Referring to FIG. 5, the conversion server 25 includes an access number calculation unit 28, a cumulative access number storage unit 27, and a URL acquisition unit 29. The access number calculation unit 28 calculates the number of accesses from the conversion server 25 with respect to a combination of a code and individual identification information. The cumulative access number storage unit 27 stores the cumulative number of accesses for each combination as the result of calculation by the access number calculation unit 28. The URL acquisition unit 29 acquires data indicating a content URL to be transmitted to the terminal 22 on the basis of the received code and individual identification information and the calculated cumulative number of accesses using the content URL storage unit 30 and the pointer storage unit 26.

When the conversion server 25 receives a combination of a code and individual identification information, the access number calculation unit 28 searches the cumulative access number storage unit 27. The access number calculation unit 28 determines whether data indicating the cumulative number of accesses related to the combination is stored.

If the data indicating the cumulative number of accesses related to the combination is not stored, an access related to the combination is recognized as a first access. Data indicating that the cumulative number of accesses=1 is stored in association with the combination in the cumulative access number storage unit 27.

If the data indicating the cumulative number of accesses related to the combination is stored, a value indicating the cumulative number of accesses is incremented and the resultant value is stored in the cumulative access number storage unit 27.

FIG. 6 illustrates the pointer storage unit 26. Referring to FIG. 6, "C1", "C2", ..., and "Cm" indicate 10-digit decimal codes. "S1", "S2", ..., and "Sn" indicate serial numbers assigned to respective terminal identification information blocks by the conversion server, serving as a content provider, in such a manner that the conversion server classifies the terminal identification information blocks by, for example, manufacturer and serializes the information blocks. In this instance, terminal identification information includes, for example, hardware individual identification information or identification information assigned to software downloaded to the terminal. In that sense, the conversion server may include another storage unit for associating a serial number with terminal identification information.

"Pij" indicates a pointer corresponding to the combination of the ith code Ci and the jth serial number Sj, the pointer indicating the address of data in the content URL storage unit 30 in which the cumulative numbers of accesses are associated with respective content URLs.

FIG. 7 illustrates the content URL storage unit 30. Referring to FIG. 7, k data blocks N1 to Nk each indicating the cumulative number of accesses are associated with content URLs, e.g., "www.contents-count-N1.co.jp" to "www.contents-count-Nk.co.jp", respectively.

As described above, in the present embodiment, different content objects can be assigned to respective terminals (users), codes, and the numbers of accesses. Consequently, content objects can be appropriately assigned to products, such as cards, on each of which an image having a code embedded therein is printed and to each of which a value is added after the product is used a predetermined number of times. Those products may include a cartoon card and a weekly magazine card. For example, when an image printed on the cartoon card is read, a user can access a four-panel cartoon site. When an image printed on the magazine card, a user can access a paid article site.

Figure 8:
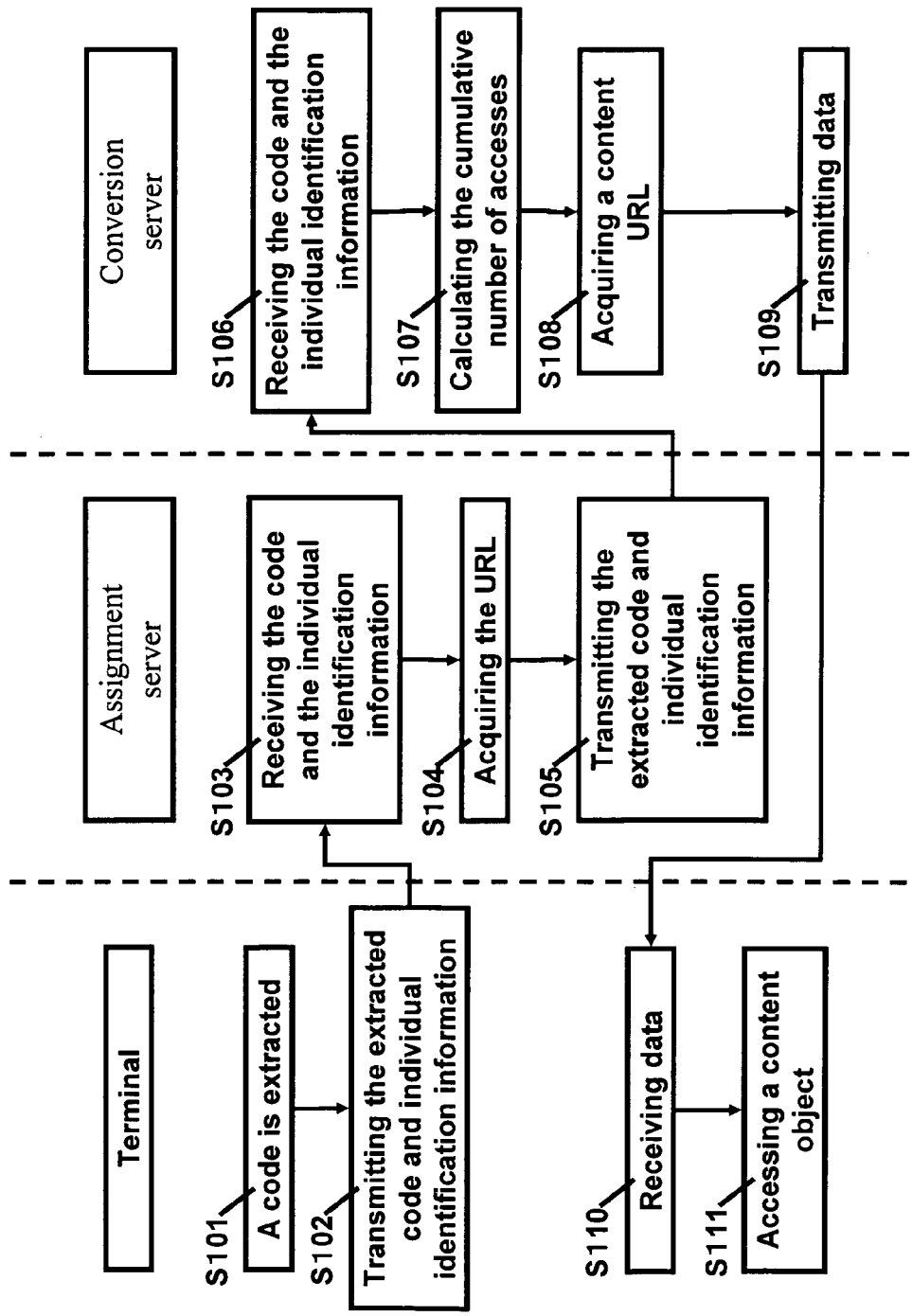
FIG. 8 is a sequence diagram illustrating an information providing process according to the first embodiment.

FIG. 8 is a sequence diagram illustrating an information providing process according to the first embodiment. Referring to FIG. 8, a code is extracted from an image printed on a medium by a terminal 22 in step S101. In step S102, the terminal 32 transmits the extracted code and individual identification information of the terminal to the assignment server 23.

In step S103, the assignment server 23 receives the code and the individual identification information from the terminal 22. In step S104, the assignment server 23 acquires the URL of a conversion server 25 related to the received code using, for example, the server-URL storage unit 24 of FIG. 4.

In step S105, the assignment server 23 transmits the code and the individual identification information received in step S103 to the conversion server 25 which has the acquired URL. In step S106, the conversion server 25 receives the code and the individual identification information from the assignment server 23. In step S107, the cumulative number of accesses related to the combination of the code and the individual identification information is calculated as described above.

In step S108, a content URL corresponding to the received code and individual identification information and the calculated cumulative number of accesses is acquired with reference to the pointer storage unit 26 of FIG. 6 and the content URL storage unit 30 of FIG. 7.

In step S109, the conversion server 25 transmits data indicating the acquired content URL to the terminal 22. In step S110, the terminal 22 receives the data indicating the content URL. In step S111, the terminal 22 accesses a content object using the content URL.

Figure 9:
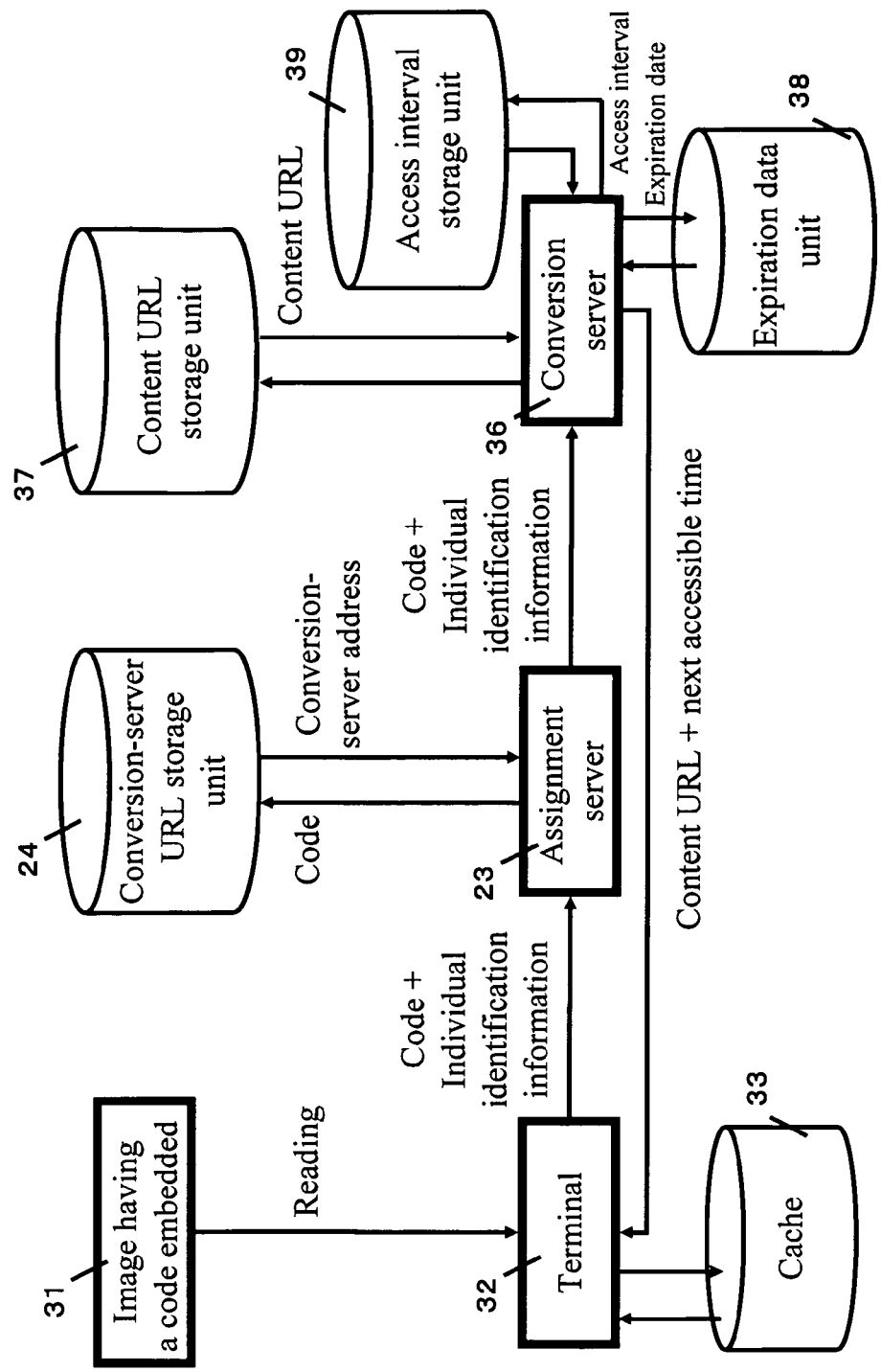
FIG. 9 is a block diagram illustrating the structure of an information providing system according to a second embodiment.

FIG. 9 is a block diagram illustrating the structure of an information providing system according to a second embodiment. Referring to FIG. 9, a terminal (camera-equipped mobile phone) 32 is operated by a user. The user operates the camera-equipped mobile phone 32 to read an image 31, which has a code embedded therein, printed on a medium and extract the code from the read image. After that, the terminal 32 transmits the extracted code and individual identification information, which is used to identify the terminal 32 in a hardware manner, to an assignment server 34.

In the present embodiment, for the sake of simplicity, the individual identification information is transmitted. Actually, either the individual identification information or identification information assigned to a program downloaded to the terminal is used as identification information of the terminal.

The assignment server 23 specifies a conversion server, which can acquire either a content object corresponding to the received code or the URL of the content object, using the conversion-server URL storage unit 24 in which codes are associated with the addresses of respective conversion servers (conversion server URLs). The assignment server 23 transfers a combination of the received code and individual identification information to the specified conversion server. In the present embodiment, it is assumed that each code is a 10-digit decimal number and the most significant digit of the code is used to specify a conversion server. As shown in FIG. 4, the conversion-server URL storage unit 24 stores the ranges of codes and conversion server URLs such that each range is associated with the corresponding conversion server URL. The first two or more digit of each code may be used to specify a conversion server as necessary.

When receiving the combination of the code and the individual identification information from the assignment server 23, a conversion server 36 acquires a content URL corresponding to the combination of the received code and individual identification information using a content URL storage unit 37. The conversion server 36 acquires an access interval related to the combination of the received code and individual identification information using an access interval storage unit 39. Further, the conversion server 36 calculates the next accessible time, at which the next access is permitted, on the basis of the acquired access interval and transmits data indicating the calculated next accessible time together with data indicating the acquired content URL to the terminal 32.

The terminal 32 stores the received content URL, the received next accessible time, and the code into a cache 33 such that the content URL, the next accessible time, and the code are associated with each other.

Figure 10:
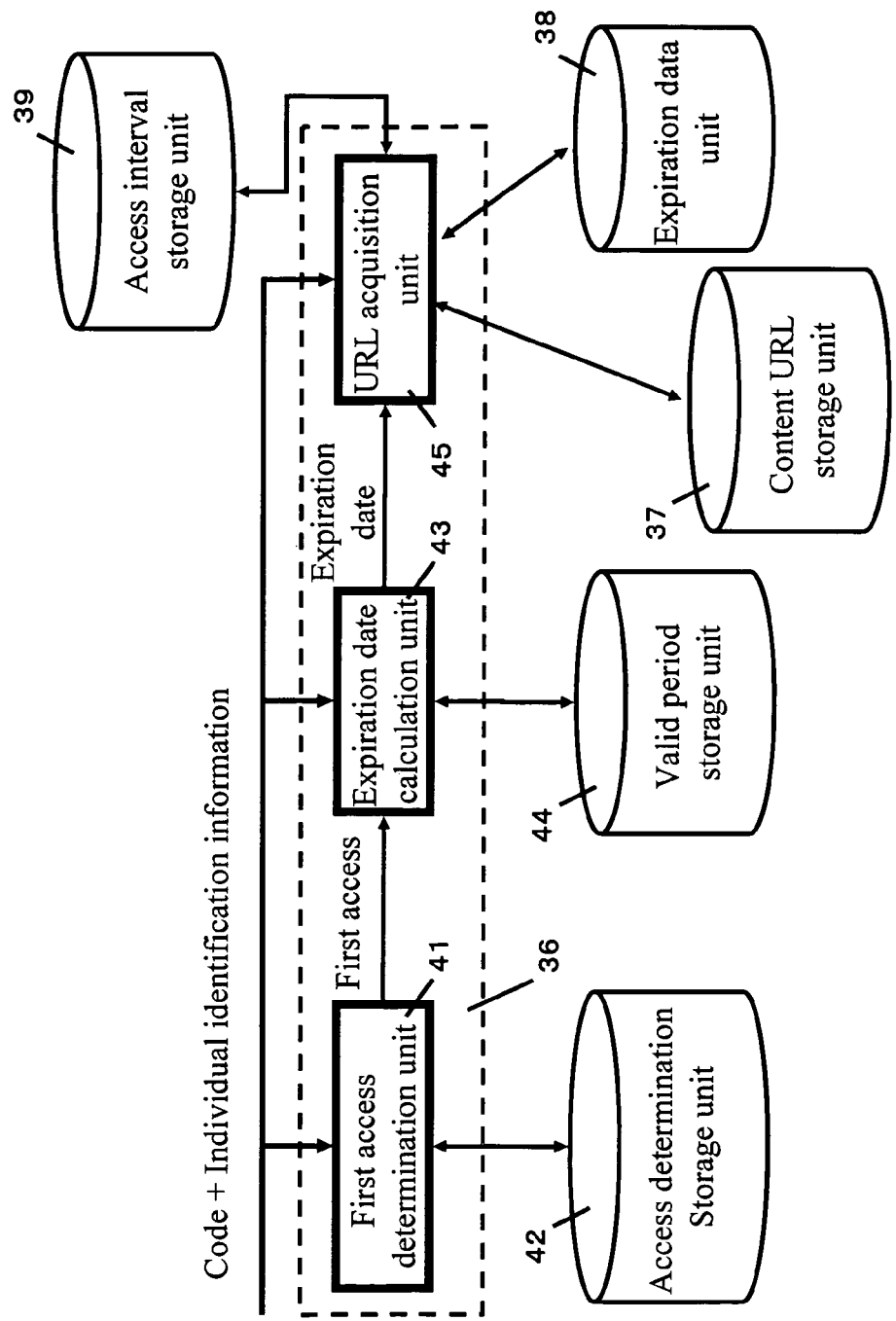
FIG. 10 is a block diagram showing the detailed structure of a conversion server in FIG. 9.

FIG. 10 is a block diagram illustrating the detailed structure of the conversion server 36 in FIG. 9. Referring to FIG. 10, the conversion server 36 includes a first-access determination unit 41, an access determination storage unit 42, a valid period storage unit 44, an expiration date calculation unit 43, and a URL acquisition unit 45. The first-access determination unit 41 determines whether a combination of a code and individual identification information transferred from the assignment server 23 serves as a first access. The access determination storage unit 42 stores the result of determination by the first-access determination unit 41. The valid period storage unit 44 stores a valid period related to the combination of the code and the individual identification information. The expiration date calculation unit 43 calculates an expiration date related to the combination of the received code and individual identification information using the valid period storage unit 44.

The expiration date calculation unit 43 is activated when receiving a signal indicating a first access from the first-access determination unit 41. If it is the first time that the conversion server 36 has received a combination of a code and individual identification information, the URL acquisition unit 45 stores data indicating an expiration date sent from the expiration date calculation unit 43 in an expiration data storage unit 38 such that the expiration date is associated with the combination. The URL acquisition unit 45 acquires a content URL corresponding to the combination of the received code and individual identification information using the content URL storage unit 37.

In addition, the URL acquisition unit 45 acquires an access interval related to the combination of the received code and individual identification information using the access interval storage unit 39 and adds, for example, the current time to the acquired access interval, thereby calculating the next accessible time. In this case, the conversion server 36 transmits data indicating the next accessible time and data indicating the content URL to the terminal 32.

If it is not the first time that the conversion server 36 has received the combination of the code and individual identification information, the URL acquisition unit 45 acquires an expiration date related to the received combination using the expiration data storage unit 38. After that, the URL acquisition unit 45 determines whether the acquired expiration date is later than the current time.

If the acquired expiration date is later than the current time, the URL acquisition unit 45 acquires a content URL corresponding to the combination of the received code and individual identification information using the content URL storage unit 37. After that, the URL acquisition unit 45 acquires an access interval related to the combination of the received code and individual identification information using the access interval storage unit 39 and adds, for example, the current time to the acquired access interval, thereby calculating the next accessible time. In this case, the conversion server 36 transmits data indicating the next accessible time and data indicating the content URL to the terminal 32.

If the acquired expiration date is before the current time, the conversion server 36 transmits a message indicating expiration to the terminal 32.

FIG. 11 illustrates the content URL storage unit 37. Referring to FIG. 11, "C1", "C2", . . . , and "Cm" indicate 10-digit decimal codes. "S1", "S2", . . . , and "Sn" indicate serial numbers assigned to identification information blocks of respective terminals by the conversion server in such a manner that the conversion server classifies identification information blocks by, for example, manufacturer and serializes the information blocks. In that sense, the conversion server may include another storage unit for associating a serial number with identification information of a terminal.

"Uij" indicates a content URL corresponding to the combination of the ith code Ci and the jth serial number Sj.

FIG. 12 illustrates the expiration data storage unit 38. Referring to FIG. 12, "C1", "C2", . . . , and "Cm" indicate the same as those in FIG. 11 and "S1", "S2", . . . , and "Sn" also indicate the same as those in FIG. 11. "Eij" indicates an expiration date related to the combination of the ith code Ci and the jth serial number Sj.

FIG. 13 illustrates the access interval storage unit 39. Referring to FIG. 13, "C1", "C2", . . . , and "Cm" indicate the same as those in FIG. 11 and "S1", "S2", . . . , and "Sn" also indicate the same as those in FIG. 11. "Iij" indicates an access interval related to the combination of the ith code Ci and the jth serial number Sj.

As described above, in the present embodiment, different content objects can be assigned to respective terminals (users) and codes. Furthermore, an expiration date can be set. Consequently, content objects can be appropriately assigned to products, such as cards, on each of which an image having a code embedded therein is printed and to each of which a value is added after the product is used for a predetermined period of time. Those products may include an electronic fortune card. For example, when an image printed on the fortune card is read, a user can access a fortune site.

Figure 14A:
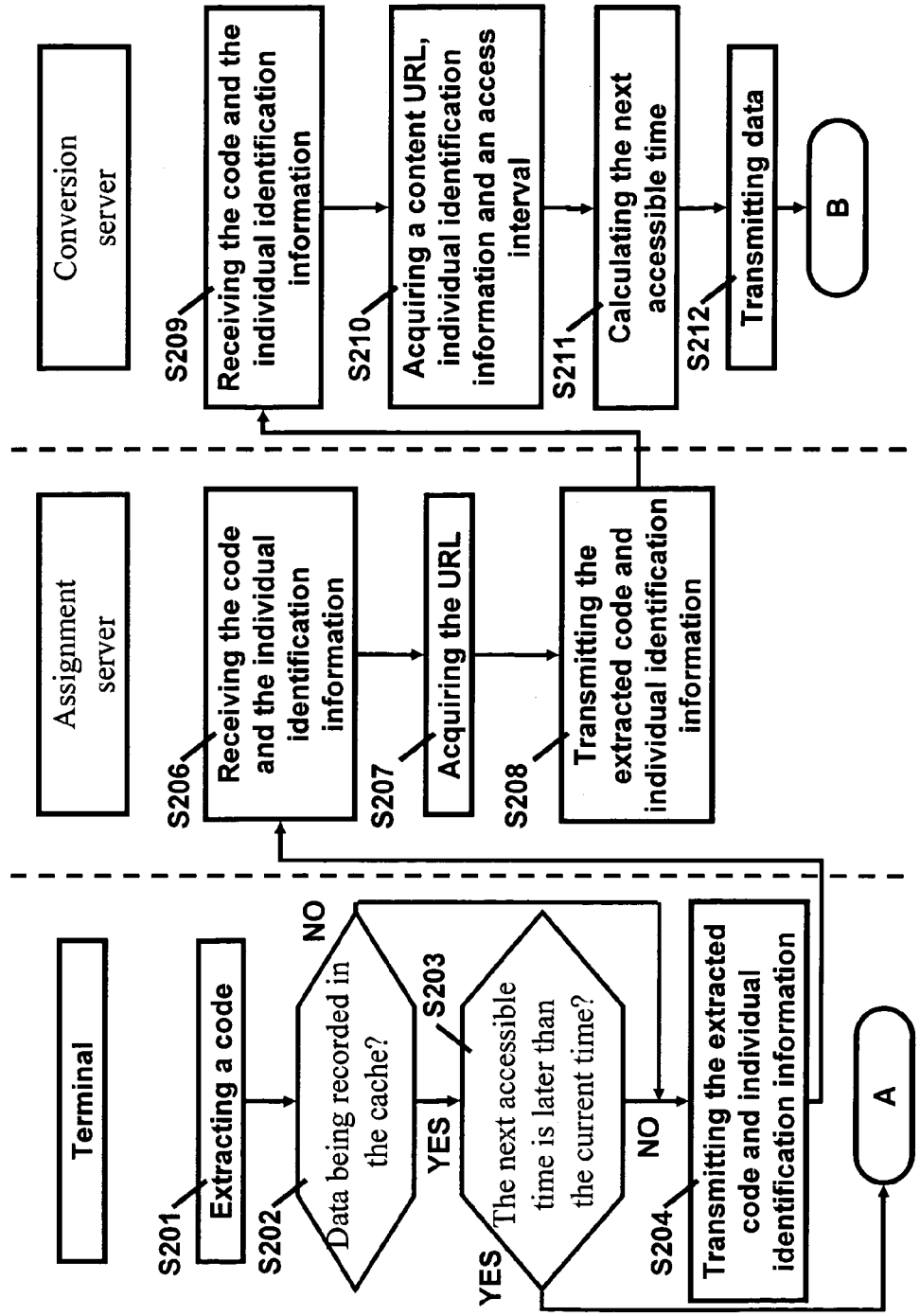
FIGS. 14A and 14B are sequence diagrams illustrating an information providing process according to the second embodiment.
Figure 14B:
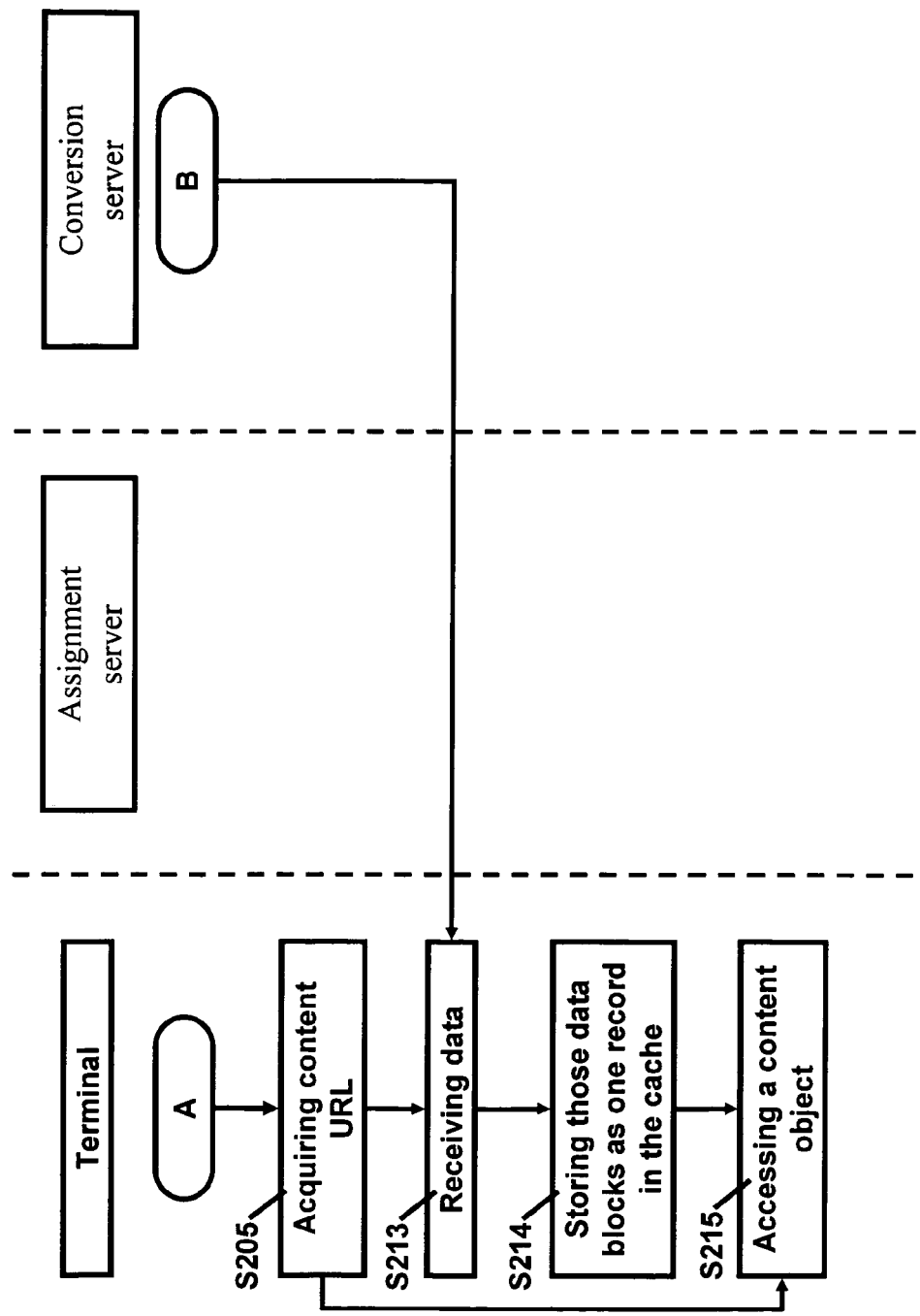

FIG. 14 is a sequence diagram illustrating an information providing process according to the second embodiment. Referring to FIG. 14, in step S201, a terminal 32 extracts a code from an image printed on a medium. In step S202, the terminal 32 determines whether data indicating the next accessible time related to the extracted code and data indicating a content URL corresponding to the code are recorded in the cache 33 of the terminal 32. If it is determined that those data blocks are recorded in the cache 33, the terminal 32 compares the next accessible time related to the code with the current time in step S203. If it is determined in step S203 that the next accessible time is later than the current time, the terminal 32 acquires the content URL corresponding to the extracted code in step S205. In step S215, the terminal 32 accesses a content object using the acquired content URL.

If it is determined in step S203 that the next accessible time is not later than the current time, the process proceeds to step S204. If it is determined in step S202 that the data blocks related to the extracted code are not recorded in the cache 33, the process proceeds to step S204.

In step S204, the terminal 32 transmits the extracted code and individual identification information of the terminal to the assignment server 23. In step S207, the assignment server 23 acquires the URL of a conversion server 36 related to the received code using, for example, the conversion-server URL storage unit 24 shown in FIG. 4.

In step S208, the assignment server 23 transmits the code and the individual identification information received in the step S206 to the conversion server 36 having the acquired URL. In step S209, the conversion server 36 receives the code and the individual identification information from the assignment server 23. In step S210, the conversion server 36 acquires a content URL corresponding to the combination of the received code and individual identification information and an access interval related thereto with reference to the content URL storage unit 37 of FIG. 11 and the access interval storage unit 39 of FIG. 13.

In step S211, in the conversion server 36, the next accessible time is calculated using the acquired access interval. In step S212, the conversion server 36 transmits data indicating the acquired content URL and data indicating the calculated next accessible time to the terminal 32.

In step S213, the terminal 32 receives the data indicating the content URL and the data indicating the next accessible time. In step S214, the terminal 32 stores those data blocks as one record in the cache 33 such that the content URL and the next accessible time are associated with the code. In step S215, the terminal 32 accesses a content object using the content URL.

Figure 15:
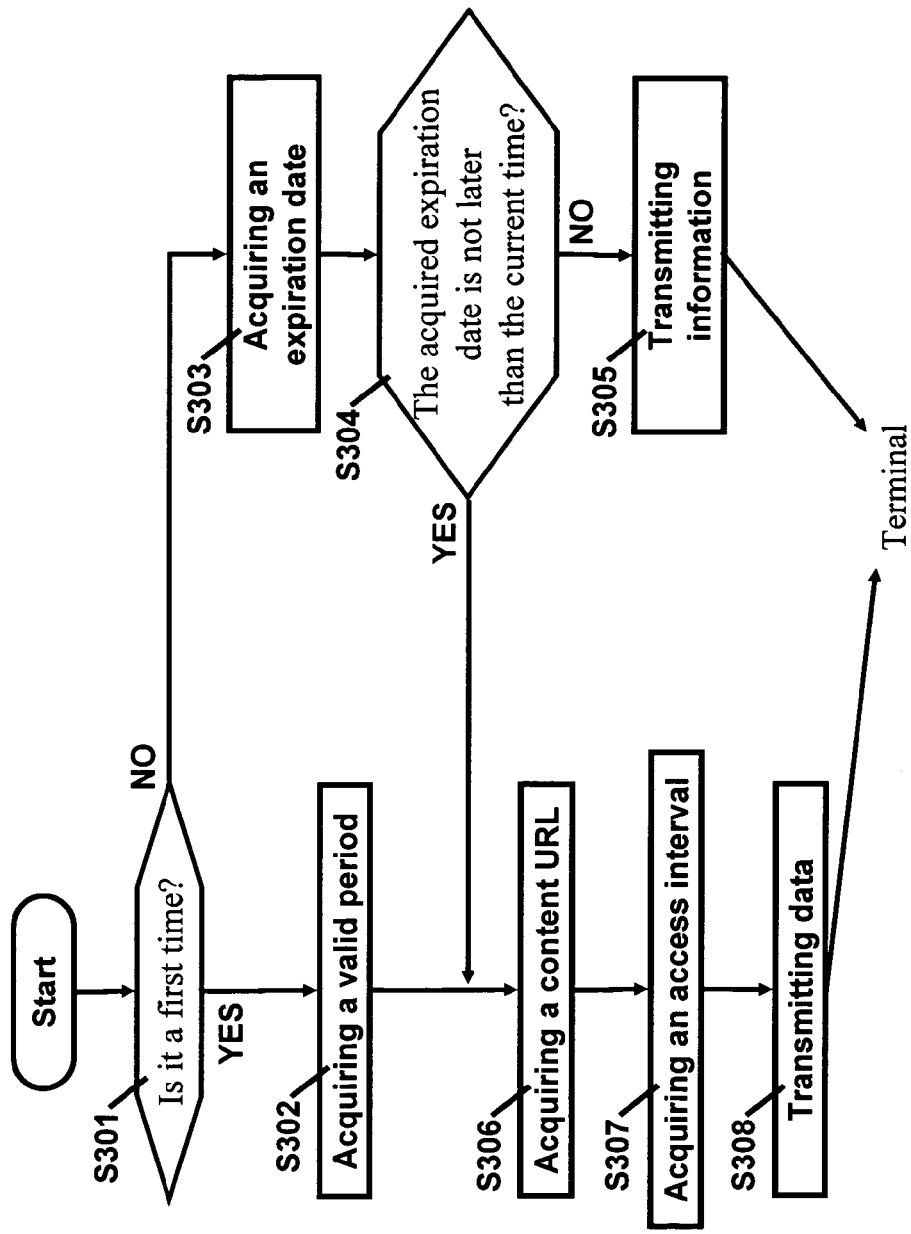
FIG. 15 is a flowchart showing processing in steps S210 to S212 in FIG. 14 in detail.

FIG. 15 is a flowchart showing the detailed processing in steps S210 to S212 in FIG. 14. This processing is activated by a trigger corresponding to reception of a combination of a code and individual identification information by the conversion server 36.

Referring to FIG. 15, in step S301, the conversion server 36 determines whether it is the first time that the conversion server has received the combination of the received code and individual identification information. When it is determined in step S301 that it is the first time, in step S302, the conversion server 36 acquires a valid period related to the combination of the received code and individual identification information and calculates an expiration date using the acquired valid period. The process proceeds to step S306.

If it is determined in step S301 that it is not the first time that the conversion server 36 has received the combination of the code and individual identification information, the conversion server 36 acquires an expiration date from the expiration data storage unit 38 in FIG. 12 in step S303. In step S304, the conversion server 36 determines whether it is valid, i.e., whether the acquired expiration date is later than the current time.

If it is determined in step S304 that the acquired expiration date is later than the current time, the process proceeds to step S306. On the other hand, if it is determined in step S304 that the acquired expiration date is not later than the current time, the conversion server 36 transmits information indicating expiration to the terminal 32 in step S305. In this instance, the fact that the expiration date is later than the current time means that the current time is within the valid period, whereas the fact that the expiration date is not later than the current time means that the expiration date has passed.

In step S306, the conversion server 36 acquires a content URL corresponding to the combination of the received code and individual identification information with reference to the content URL storage unit 37 of FIG. 11. In step S307, the conversion server 36 acquires an access interval related to the combination of the received code and individual identification information with reference to the access interval storage unit 39 of FIG. 13 and calculates the next accessible time using the acquired access interval. In step S308, the conversion server 36 transmits data indicating the acquired content URL and data indicating the calculated next accessible time to the terminal 32.

In the second embodiment, the next accessible time need not be calculated and need not be stored in the cache 33. In the second embodiment, if the cache 33 of the terminal 32 has a small capacity, typically, a content object is not stored in the cache. Instead, the content URL is stored in the cache 33 together with the next accessible time and the related code.

In the present embodiment, content objects can be appropriately assigned to products, such as cards, on each of which an image having a code embedded therein is printed and to each of which a value is added after the product is used a predetermined number of times or for a predetermined period of time. Consequently, products, such as cards, on each of which an image having a code embedded therein is printed can be applied in more various formats.

What is claimed is:

1. A system, comprising:
  a client that obtains a code included in an image, and that sends out the code and identification information of the client; and
  a server including,
    a storage that stores a number of accesses per the server from the client and, a table containing content address information that enables access to a content, in association with the code, and
    a calculation unit that calculates a number of accesses with respect to a combination of the code and the identification information based on the number of accesses stored in the storage, obtains the content address information based on the number of accesses, the code and the identification information in reference to the table, and provides the content address information to the client whereby the client is enabled to obtain content information by using the content address information.

2. The system of claim 1, wherein the server further provides valid period information corresponding to the content address information.

3. The system of claim 2, wherein the server further provides information indicating that the content address information is expired based on the valid period information and current time information.

4. A server being capable of communicating with a client for obtaining a code included in an image and sending out the code and identification of the client, the server comprising:
  a storage that stores a number of accesses per the server from the client, and a table containing content address information that enables access to a content, in association with the code; and
  a calculation unit that calculates a number of accesses with respect to a combination of the code and the identification information based on the number of accesses stored in the storage, obtains the content address information based on the number of accesses, the code and the identification information in reference to the table, and provides the content address information to the client whereby the client is enabled to obtain content information by using the content address information.

5. A method, comprising:
  obtaining a code included in an image by a client;
  sending out the code and identification information of the client to a server;
  storing a number of accesses per the server from the client, and a table containing content address information that enables access to a content, in association with the code, by the server;
  calculating a number of accesses with respect to a combination of the code and the identification information based on the stored number of accesses;
  obtaining the content address information based on the number of accesses, the code and the identification information in reference to the table; and
  providing the content address information to the client whereby the client is enabled to obtain content information by using the content address information.

6. The method of claim 5, further comprising providing valid period information corresponding to the content address information.

7. The method of claim 6, further comprising providing information indicating that the content address information is expired based on the valid period information and current time information.

* * * * *

UNITED STATES PATENT AND TRADEMARK OFFICE
CERTIFICATE OF CORRECTION

| | | |
|---|---|---|
| PATENT NO. | : 7,806,327 B2 | |
| APPLICATION NO. | : 12/071801 | |
| DATED | : October 5, 2010 | |
| INVENTOR(S) | : Kenichiro Sakai et al. | |

It is certified that error appears in the above-identified patent and that said Letters Patent is hereby corrected as shown below:

First Page Column 2 (Abstract), Line 6 after "server" insert --, and--.

Signed and Sealed this
Twenty-eighth Day of December, 2010

David J. Kappos
*Director of the United States Patent and Trademark Office*